United States Patent Office 3,058,890

Patented Oct. 16, 1962

3,058,890

PROCESS FOR THE PREPARATION OF PECTOLYTIC ENZYMES

Yukichi Miura and Akira Endo, Tokyo, Japan, assignors to Sankyo Company, Limited, Tokyo, Japan No Drawing. Filed July 21, 1960, Ser. No. 44,292
Claims priority, application Japan July 25, 1959
8 Claims. (Cl. 195—66)

This invention relates to a process for the preparation of pectolytic enzymes.

Pectolytic enzymes, otherwise referred to as pectinases, are enzyme complex which have the action of hydrolyzing pectic substances to promote the formation of lower uronides and galacturonic acid. A considerably large number of such enzymes is known and industrially used. For example, those obtained by cultivation of fungi such as Aspergillus and Penicillium are used in squeezing the juice of fruits and for clarifying fermented fruit drinks. A number of microorganisms other than these fungi that produce pectolytic enzymes, such as certain bacteria and yeasts, are also known.

The pectolytic enzymes mentioned above have some notable disadvantage in the production of enzymes and their uses. Fungi such as Aspergillus and Penicillium are of decisive disadvantage in that they generally possess weak enzymatic activities, though their growth on solid and liquid cultures under aerobic conditions is good. Furthermore, the sole use of enzymes produced by these fungi cannot produce effects sufficient for some purposes. It is therefore necessary to supplement other effective constituents such as gelatin or casein. Sclerotinia such as *Sclerotinia libertiana,* which are known to produce pectolytic enzymes, grow slowly, are sensitive to heat and other physical and chemical irritations and have low resistance to other microorganisms so that for their cultivation processes a long period of time is required and close attention must be paid.

The amount of pectolytic enzymes produced by bacteria and yeast is very small and it is impossible to use them industrially. The enzymes produced by bacteria require alkaline pH to exert their activity and lose the activity at acid pH. They are unqualified for hydrolysis of plant materials such as the squeezed juice of fruits since almost all of them are acid substances.

Pectolytic enzymes are not materials which are composed of a single enzyme but they are complex substances comprising at least two sorts of enzymes. As they can be neither identified in their chemical structures nor synthesized on a commercial scale, the chief source of their supply must depend upon the above-mentioned microorganisms as well as upon certain higher plants.

Some attempts have been hitherto made to prepare pectolytic enzymes at moderate prices and in a ready way using microorganisms such as fungi, bacteria and yeasts. The results of these studies have been published in literature, for example, Demain and Phaff: Wall. Lab. Commn., volume XX, 119 (1957), and Deuel and Stutz: Advances in Enzymology, volume 20, 341 (1958).

The majority of previous attempts at culturing microorganisms under conditions suitable for industrial production of pectolytic enzymes have been only moderately successful. The methods disclosed in the prior art have been severely limited because of the lack of producing microorganisms of high activity. The scope of available microorganisms is hitherto very limited; a long period of time as well as expensive media are required for the cultivation; suitable methods are not found for the separation and purification of enzymes. In addition, the enzymes separated in accordance with the previous methods are in many instances apt not to exert satisfactory effect required for the purpose of use under definite conditions.

We have now found that subjecting a plant pathogenic microorganism *Coniothyrium diplodiella* to solid culture under aerobic condition to produce pectolytic enzymes provides a method of producing pectolytic enzymes possessing marked advantages as under: (1) The power of producing pectolytic enzymes is great; (2) the cultivation may be readily conducted and the cultivation period of time is short due to rapid production of enzymes; and (3) the mycelia being not so strongly twisted the extraction and separation of enzymes are easily made. The microorganism employed in the process of the present invention is readily available from laboratories active in the research of phytopathogens.

The pectolytic enzymes prepared according to the process of this invention are used for various purposes. For instance, treatment of smashed fruit such as apple and grape with the enzymes at temperatures between 30 and 40° C. brings about hydrolysis of pectic substances in the fruit tissue with the results that the viscosity is reduced, the squeezing procedures improved and the amount of squeezed juice increased. The squeezed fruit juice treated in this way being clear, clarification is successful. The fruit juice following treatment with the enzymes is not deteriorated in the aspects of reduced sugar, acidity, taste and the like. In the brewing of grape and apple wines the addition of the enzymes at the time of charge followed by fermentation results in hydrolysis of the pectic substances in the fermented liquor in parallel with the fermentation to yield the clear fruit wines. Precipitation of crude tartar in grape wine is also accelerated. The use of an adequate amount of the enzymes in wine improves the flavor and quality.

The actions of the enzymes prepared according to the method of this invention, were compared with those from Sclerotinia and those from Penicillium when added to the smashed fruit of apple to find that the degree of clarification with the enzymes of this invention was the greatest although being almost same in the increase in the amount of squeezed juice. Tests on fermentation and clarification in brewing of white wine using the three enzymes revealed that the color of fermented liquor using the enzymes of this invention was the most light and a little superior in flavor. In the production of concentrated juice, during which viscosity increases as concentration proceeds due to the presence of pectic substances in the juice and the concentration procedures are troublesome, hydrolysis of the pectic substances by the use of the enzymes produces a satisfactory result. In addition, the yield of citric acid from citrus such as lemon and orange is increased by the use of the enzymes due to promotion of crystallization of the acid.

It is disadvantageous that acid or alkaline hydrolysis of pectin, beet pulp and other pectin-containing substances for the production of galacturonic acid is usually associated with farther decomposition of the products to result in difficulty in separation and low yield. On the other hand, in the use of the enzymes of this invention a moderate and complete hydrolysis takes place with the result that the desired product is obtained in a high yield. In addition, the action of the enzymes of this invention on beet pulp yields a large amount of arabinose besides galacturonic acid.

The relationship between time of treatment and hydrolyzing rate when 100 ml. of 0.5% pectin solution are treated at 30° C. at a pH of about 4 respectively with 100 mg. of the pectolytic enzymes according to the present invention (1) those from Sclerotinia (11) and those from Penicillium (111) is shown in the table below.

| | | | | |
|---|---|---|---|---|
| Time of treatment (hr.) | 5 | 10 | 15 | 20 |
| hydrolysis with 1 percent | 35 | 54 | 67 | 76 |
| hydrolysis with 11 percent | 21 | 32 | 40 | 44 |
| hydrolysis with 111 percent | 15 | 26 | 33 | 36 |

The above-mentioned results demonstrates that the enzymes 1 are far superior to the others 11 and 111 in the initial rate of pectin hydrolysis. Moreover, complete hydrolysis of pectin to give galacturonic acid occurred in 40 hr. with the enzymes 1, while more than 200 hr. with the other two 11 and 111, thus showing that a far shorter period of time was required for effecting complete hydrolysis with the former.

Comparison of cultivation time and production of enzymes between the process according to the present invention (1) and one using Sclerotinia (11) cultivated on a solid medium under the identical conditions is given below.

| Cultivation time (day) | Enzyme activity | |
|---|---|---|
| | 1 | 11 |
| 3 | 250 | 15 |
| 6 | 500 | 150 |
| 9 | 620 | 200 |
| 13 | 650 | 300 |

Enzyme activity is expressed in unit of clarification for apple juice described hereinafter.

In this way, it was found that the microorganisms used in the process according to the present invention produced powerful pectolytic enzymes from the initial period of cultivation.

The mycelia of the microorganism used in this invention formed on solid culture is far finer than those of Penicillium, Aspergillus and Sclerotinia. The mycelia, in addition, is usually short and soft. The solid cultivated mass obtained after completion of cultivation may be consequently readily pulverized.

Moreover, easy and short-time extraction of the enzymes from the solid cultivated mass in good yield results from the fact that almost no intertwist between mycelia is produced.

The pectolytic enzymes produced by the process according to this invention are composed of proteinous substances of unknown chemical structure and considered to comprise such pectolytic enzymes as pectinesterase and polygalacturonase. In the enzymes obtained in this invention seem to be present polymethylgalacturonase and the like in addition to the two sorts of enzymes mentioned above. The outstanding characteristics of the enzymes of the present invention may be ascribed to the synergetic actions of these enzymes present on pectic substances.

*Coniothyrium diplodiella* used for the production of enzymes in this invention specifically produces pectolytic enzymes during cultivation but the activities of other hydrolytic enzymes then produced is very low. It exerts very weak amylolytic proteolytic actions and the amounts of enzymes such as cellulase and lipase contained therein are only trace.

The pectolytic enzymes contained in the enzymes produced by the process in accordance with this invention are of stable action being active on pectin and pectic acid at a wide range of pH values between 2.5 and 6.5. The optimum pH of hydrolysis of both pectin and pectic acid lie between 4 and 4.5. Clarification of orange, apple or grape fruit juice is effected by hydrolyzing pectic substances at pH of a range between 2.5 and 6.5.

When the enzymes of this invention are reacted with pectin containing 10.5% methoxyl group and pectic acid used as the substrate at pH of 4.0 (acetate buffer) at 30° C. the ratio of hydrolyzing velocities of the two is 1:6. The hydrolysis of pectin at pH of 4.0 proceeds linearly until the 70–80% hydrolysis and the velocity is gradually slowed down to a 100% hydrolysis. Similarly, the hydrolysis of pectic acid proceeds linearly until 50–60% hydrolysis and the velocity is gradually slowed down to a complete hydrolysis.

The addition of pectinesterase slightly promotes the hydrolysis of pectin with the enzymes of this invention. There is also a similar tendency in the hydrolysis of pectic substances in fruit juice.

The hydrolytic activity of the enzymes of this invention upon pectic substances is sufficiently high even at temperatures as low as 10–15° C. The velocity of hydrolysis increases in proportion to a rise of temperature until it reaches 50° C. The optimal operating temperature is between 40 and 45° C. Inactivation of activity of the enzymes of this invention as much as about 60% is brought about when heat-treated at 60° C. for 20 min. (pH 4.0).

The enzymes of this invention are most stable at pH values between 2 and 6. Preservation at a pH of more than 6.5 for a long period of time tends to cause gradual inactivation of enzyme activity.

Hydrolysis of pectin acid with the enzymes of this invention proceeds with elapse of time in the following way viewed from examination on the products: there are found at the early stage galacturonic acid and di-, tri- and tetragalacturonic acids, thus suggesting the characters of hydrolyzing pectin both at the end of molecular chain and at random in the molecule. In this respect reduction in viscosity as well as formation of reduced group simultaneously occur.

The presence of certain alcohols does not so much affect the action of the enzymes of this invention. The period of time required for clarifying at 30° C. apple fruit wine and one admixed with ethyl alcohol to 15% concentration by volume when treated with a definite amount of the enzymes were respectively 25 and 40 min.

Toxicity test on the enzymes obtained by the process according to this invention revealed that their administration in an amount as much as 8 g./kg. bodyweight of mice did not indicate any toxic symptom.

*Coniothyrium diplodiella* used in the fermentation process according to the present invention is a sort of plant pathogens and causes white rot in vine. The microorganism is a member of *Fungi imperfecti* and classified as the order Sphaeropsidales because of its formation of conidium. It produces pycnidium and belongs to the family Sphaerioidaceae of the said order. This microorganism belongs to the genius Coniothyrium of the family. It causes spotted formation of brown puncta on fruit, fruit-stalk and young tree top. Spore is oval or fusiform and monospore 7–11 x 3.5–5.5$\mu$ in size. On attaining full growth it colors brown. Reference of the above descriptions is made to "Handbook of Microbiology," pp. 379–380, Gihodo, Tokyo, 1957.

As the solid medium used in carrying out the present invention may be used the media usually available for sufficiently attaining the object of invention. For example, rice bran such as defatted rice bran, wheat bran and/or beet pulp as it is or such material to which adequate nutrients are added may be employed as the solid medium. With aforementioned rice bran, wheat bran and/or beet pulp the microorganism exhibits good growth because carbon and nitrogen sources contained therein are sufficient to produce a satisfactory amount of enzymes but it is preferred to add other nutrients. On carrying out the cultivation in the presence of nutrient added, plant protein, casein, pepton and asparagine may be used as the nitrogen source and arabinose, xylose, galacturonic acid, mannose, galactose, pectin, pectic acid and starch as carbon source.

The temperature during fermentation of the microorganism may be maintained between 20° C. and 30° C., a range of 25° C. to 30° C. being preferred. It grows even at temperatures above 30° C. but the production of enzymes is rapidly reduced. The growth is too slow at temperatures below 25° C., associated with reduction in the production of enzymes.

The time required for the production of a maximum amount of pectolytic enzymes may be widely varied, depending upon the nature of the particular ingredients employed in the medium. However, a period from 48 to 96 hours is usually considered adequate for the production of maximal amount of the enzymes.

In the preferred embodiment of the present invention according to the solid culture method the said microorganism is beforehand cultivated for the use as an inoculum and inoculated. The microorganism which is to be used as the inoculum may be grown on an agar slant and 50–100 ml. of the liquid medium inoculated with a loopful of mycelium taken from an agar slant, followed by seed cultivation for 24–72 hours. Also it has been found that seed culture grown on a solid medium may be effectively employed. One loopful of mycelium may be taken from an agar slant, deposited into an amount of 50–100 g. of solid medium such as defatted rice bran or wheat bran and allowed to incubate for a period from 48 to 72 hours at a temperature from 25 to 30° C.

In carrying out the main cultivation sterilization is made after addition of adequate volume of water to defatted rice bran, wheat bran and/or beet pulp. Addition of adequate nutrients such as organic substances and inorganic salts may be supplemented. After completion of sterilization 0.5–5% seed culture on the liquid or solid medium as aforementioned is added to the sterlized nutrient medium with stirring for mixing. Incubation is performed for 48–72 hours at 25–30° C. to attain the maximal yield of enzymes.

In order to separate the enzymes from a solid culture at the conclusion of the fermentation process, various methods may be employed. The solid material may be used for clarification of materials such as fruit juice and wine without any farther processing with a satisfactory result since the microorganism possesses a strong pectolytic enzyme-producing activity. The solid material is immediately dried with airing to a water content as low as about 10% and pulverized. The drying with airing may be conducted after sterilization by the addition of organic solvent such as acetone or lower alcohols, for example, methyl or ethyl alcohol.

Separation of the enzymes from the solid material may be effected by extraction with a suitable extracting agent. The addition of two to ten volumes of water in a batch or in a continuous manner using a percolator is preferred for the extraction procedure. In the former case is obtained the extract by centrifugation or filtration. In general, the extraction of enzymes may be effectively performed but in some cases extraction with a salt or buffer solution in an adequate concentration is effective to obtain the enzymes. Acetate or phosphate buffer may be mentioned as the examples. No particular care is not needed when the extraction is conducted at ordinary temperature but the lower the temperature the less is the destruction of the enzyme. It is preferable in view of the stability of enzymes to maintain pH of the extract between 2 and 7.

The extract as it is may be employed as the enzyme material. Separation of the enzymes from the extract is effected either by precipitation with organic solvents such as acetone, lower alcohols, for example, methyl and ethyl alcohols and dioxane or by salting-out with salts such as ammonium, magnesium and sodium sulfates. For the purpose of avoiding destruction of the enzymes in order to separate them efficiently, it is necessary to carry out the precipitation procedure at a low temperature from about 0 to 4° C. In the use of organic solvents, which occasionally have a character to inactivate the enzymes, the procedure should be carried out with particular care. pH between 2 and 6 during the procedure produce almost the same result but, if necessary, pH is adjusted with an acid or an alkali such as aq. ammonia, sodium hydroxide, hydrochloric or acetic acid.

As the organic solvent acetone is most usually used. Dioxane and lower alcohols such as methyl, ethyl, propyl and isopropyl alcohols may be also employed with the same result.

It is preferable in the precipitation with acetone to cool in advance both the enzyme solution and acetone to 0–4° C. followed by mixing thereof. The above procedures may be carried out at room temperature to give the same result. After completion of the addition of acetone, the mixture is allowed to stand at 0–4° C. for a period from 12 to 36 hours or immediately subjected to separation procedure of the precipitates. As the method of separation may be applied centrifugal and filtration methods. The filtration may be carried out by means of diatomaceous earth or a similar filter aid. Separation of the enzymes from the filter aid may be effected by the use of water, but it is more effective to carry out the separation by washing with such a salt solution as a solution of ammonium sulfate or calcium acetate in a concentration of about 1%.

The acetone-precipitated pectolytic enzymes may then be readily put into a stable, commercially useful form by a number of simple procedures, among which are freez-drying to give a stable solid or suspension in anhydrous acetone followed by filtration and drying.

It has been found desirable to employ a protective agent in drying the pectolytic enzymes. Such a adjuvant is desirable whether the process used is freez-drying or solvent-drying such as with acetone, methyl or ethyl alcohol. The protective adjuvants which we have found to be satisfactory for this purpose are lactose, dextrose, gelatin and casein, although others of similar nature will occur readily to those skilled in the art. The protective adjuvants are preferably added to enzyme solution before the step of freez-drying or solvent-drying.

Although the exact nature of the action of the protective adjuvant is not known, it is possible that it functions as a humecant. It may be, however, that the adjuvant simply forms a coating around minute particles of drying enzymes and serves as a protection from the atmosphere. The protecting agents such as gelatin and casein promote the enzymatic action when used for clarification of fruit juice.

When it is elected to perform the precipitation with acetone, the use of adjuvant alone tends to result in the formation of a gummy precipitate which cannot be resolved into a satisfactory dry form. It is advantageous in such cases to employ a bulking agent together with the adjuvant before addition of the acetone. This procedure insures the formation of a solid, tractable precipitate which may be readily dried. Bulking agents which have been found particularly satisfactory are starch, wood pulp, magnesium silicate, diatomaceous earth, and compounds of similar nature. The protective adjuvant and the bulking agent are added to an aqueous solution containing the pectolytic enzymes and the mixture is stirred. Two to five volumes of acetone or ethyl alcohol are then added with stirring at a low temperature and the active precipitate thus formed is collected by filtration and washed with acetone. The precipitate is suspended in anhydrous acetone, filtered, dried in the air and pulverized.

The pulverized pectolytic enzymes obtained in this way may fit almost every purpose of use. However, if the enzymes of particularly high purity are needed, the extract obtained as above from the solid culture is mixed with calcium or zinc acetate or a salt of similar nature, followed by separation of the precipitate thus formed. If calcium acetate is used in this procedure it is added to the extract in such a quantity as to obtain a calcium acetate concentration of 0.02–0.05 mole. It is usually not required in this case to adjust the pH but it is preferable to adjust it to between 4 and 7 with an acid or an alkali because the enzyme is stable at this pH value. The precipitate formed is separated by centrifugation or filtration and the enzyme solution thus obtained subjected to precipitation by means of an organic solvent, ammonium sulfate or the like to give precipitate, which is then separated.

The enzymes prepared by the process according to the present invention has a pectolytic activity of more than 100 units per one gram of the fermented material on cultivation. If conditions such as time, temperature, pH and nutrient are suitable a product of activity as high as 600 units per gram is obtained.

The activity unit of pectolytic enzymes used in this invention is expressed as determined by the method described below. As the substrate is used fresh apple fruit squeezed juice, which is obtained by smashing fresh apple fruit followed by filtration. To 10 ml. of the apple fruit juice that has been beforehand warmed to 30° C. is added 1 ml. of the enzyme solution (aq. extract of solid culture) and the mixture incubated at 30° C. When hydrolysis of pectic substances in the juice proceeds to a definite degree the juice starts to coagulate and subsequently the coagulate precipitates. The time required to initiate the coagulation of the fruit juice is proportional to the amount of enzyme present. The activity capable of initiating coagulation of 10 ml. of fresh apple juice at 30° C. in a period of 30 min. is set as one unit. Enzyme solution is diluted to an adequate concentration in such a way that the coagulation requires about 30 min. and the enzyme activity is determined from the multiple of dilution. For example, if 1 g. from solid culture is extracted with 100 cc. of water and the extract treated in such a way as described above, coagulation occurs in 30 min. The activity corresponds to 100 units per gram.

The following examples are given as illustrative of our process, but are not intended to be limitative upon the scope thereof.

*Example 1*

To 10 kg. of defatted rice bran are added 6 l. of tap water. The mixture is well stirred, sterilized at 120° C. for 30 min. and then allowed to cool. The nutrient medium is inoculated with precultivated seed culture of *Coniothyrium diplodiella* (from 3-day old culture at 25–30° C. of a loopful of mycelium from agar slant on a sterilized medium consisted of 100 g. of rice bran and 60 ml. of tap water) and incubated for 3 days at 25–30° C. The dried fermented product has a pectolytic activity of 500 units per gram.

*Example 2*

Dried sugar beet pulp is swelled with water and the excess water removed. The nutrient medium is sterilized under pressure at 120° C. for 30 min. followed by cooling. A seed culture of *Coniothyrium diplodiella* from a 3-day old bottle solid culture is added to the nutrient medium and incubated at a temperature from 26 to 28° C. for 3 days. The dried fermented product has a pectolytic activity of 350 units per gram.

*Example 3*

The solid fermented product obtained by the same procedures as in Example 1 except that wheat bran is used in place of defatted rice bran has a pectolytic activity of 250 units per gram.

*Example 4*

The solid fermented product obtained in the same way as in Example 1 except that a mixture of equal amounts of wheat bran and sugar beet pulp is used in place of defatted rice bran has a pectolytic activity of about 400 units per gram.

*Example 5*

The dried fermented product is placed in a metal column, from the upper surface of which is poured tap water for effecting continuous extraction. Thirty litres of the extract obtained has a pectolytic activity of about 4,700,000 units.

*Example 6*

To 30 l. of the extract obtained in the same way as in Example 5 are added 90 l. of ethyl alcohol at 0° C. The mixture is stirred and then allowed to stand at 4° C. for 12 hours, followed by centrifugation. The precipitate obtained is dissolved in 2 l. of 1% saline solution. The saline solution thus obtained has a pectolytic activity of about 4,500,000 units.

*Example 7*

To 30 ml. of the extract obtained in the same way as in Example 5 are added 3 l. of 1 M calcium acetate, followed by adjustment of pH to 6.0 with sodium hydroxide. The mixture is allowed to stand overnight at 4° C. About 30 l. of the enzyme solution obtained by removal of precipitate has a pectolytic activity of about 3,900,000 units.

*Example 8*

To 10 l. of the enzyme solution obtained in the same way as in Example 7 are added 30 l. of cold ethyl alcohol and the mixture is allowed to stand at 4° C. for 12 hours. Precipitate thus formed is separated by centrifugation. The precipitate obtained is dissolved in 5 l. of 1% saline solution. The resulting solution has a pectolytic activity of 1,100,000 units.

*Example 9*

To 5 l. of the saline solution obtained in the same way as in Example 8 are added 200 g. of gelatin and 150 g. of diatomaceous earth. The mixture is stirred, during which time 15 l. of cold ethyl alcohol are added. The solid matter is precipitated and the supernatant removed by decantation. The solid matter is separated by filtration and dried with acetone and then in the air. The dried material thus obtained has a pectolytic activity of 950,000 units.

We claim:

1. A process for the production of a pectolytic enzyme which comprises growing *Coniothyrium diplodiella* in a solid medium selected from the group consisting of rice bran, wheat bran, beet pulp and mixture thereof under aerobic conditions and isolating the pectolytic enzymes thus produced.

2. A process for the production of a pectolytic enzyme which comprises growing *Coniothyrium diplodiella* in a solid medium selected from the group consisting of rice bran, wheat bran, beet pulp and mixtures thereof, the said medium further containing an assimilable nitrogen, under aerobic conditions and isolating the pectolytic enzymes thus produced.

3. A process for the production of a pectolytic enzyme which comprises growing *Coniothyrium diplodiella* under aerobic conditions in a solid medium selected from the group consisting of rice bran, wheat bran, beet pulp and mixtures thereof at a temperature within the range of 20° C. to 30° C. for a period of time from about 45 to 96 hours and isolating the pectolytic enzymes thus produced.

4. A process for the production of a pectolytic enzyme which comprises growing *Coniothyrium diplodiella* under aerobic conditions in a solid medium selected from the group consisting of rice bran, wheat bran, beet pulp and mixtures thereof, the said medium further containing an assimilable carbohydrate and a source of assimilable nitrogen at a temperature within the range of 20° C. to 30° C. for a period of time of about 48 to 96 hours and isolating the pectolytic enzymes thus produced.

5. A process for the production of pectolytic enzymes-containing fermented material which comprises growing *Coniothyrium diplodiella* in a solid medium selected from the group consisting of rice bran, wheat bran, beet pulp and mixture thereof under aerobic conditions.

6. A process for the production of pectolytic enzymes-containing fermented material which comprises growing *Coniothyrium diplodiella* in a solid medium selected from the group consisting of rice bran, wheat bran, beet pulp and mixture thereof, the said medium further containing an assimilable carbohydrate and a source of assimilable nitrogen, under aerobic conditions.

7. A process for the production of pectolytic enzymes-containing fermented material which comprises growing *Coniothyrium diplodiella* under aerobic conditions in a solid medium selected from the group consisting of rice bran, wheat bran, beet pulp and mixture thereof at a temperature within the range of 20° C. to 30° C. for a period of time from about 45 to 96 hours.

8. A process for the production of pectolytic enzymes-containing fermented material which comprises growing *Coniothyrium diplodiella* under aerobic conditions in a solid medium selected from the group consisting of rice bran, wheat bran, beet pulp and mixture thereof, the said medium further containing an assimilable carbohydrate and a source of assimilable nitrogen at a temperature within the range of 20° C. to 30° C. for a period of time of about 48 to 96 hours.

References Cited in the file of this patent

UNITED STATES PATENTS

| | | |
|---|---|---|
| 2,102,315 | Grassmann et al. | Dec. 14, 1937 |
| 2,599,531 | Smythe et al. | June 10, 1952 |
| 2,801,954 | Damodaran et al. | Aug. 6, 1957 |